(12) United States Patent  
Park et al.

(10) Patent No.: US 8,834,179 B2
(45) Date of Patent: Sep. 16, 2014

(54) STEERING ROLL CONNECTOR FOR A VEHICLE

(75) Inventors: Jong Chul Park, Ansan-si (KR); Eui Yeung Ahn, Seoul (KR)

(73) Assignee: Daesung Electric Co., Ltd., Gyeonggi-do (KR)

( * ) Notice: Subject to any disclaimer, the term of this patent is extended or adjusted under 35 U.S.C. 154(b) by 109 days.

(21) Appl. No.: 13/520,992

(22) PCT Filed: Mar. 12, 2010

(86) PCT No.: PCT/KR2010/001573
§ 371 (c)(1),
(2), (4) Date: Jul. 6, 2012

(87) PCT Pub. No.: WO2011/083890
PCT Pub. Date: Jul. 14, 2011

(65) Prior Publication Data
US 2013/0000953 A1    Jan. 3, 2013

(30) Foreign Application Priority Data
Jan. 6, 2010    (KR) ........................ 10-2010-0000990

(51) Int. Cl.
*H01R 39/00* (2006.01)
*B60R 16/027* (2006.01)
*H01R 35/00* (2006.01)
*H01R 35/02* (2006.01)

(52) U.S. Cl.
CPC .............. *B60R 16/027* (2013.01); *H01R 35/00* (2013.01); *H01R 35/02* (2013.01)
USPC ............................................ 439/15; 439/146

(58) Field of Classification Search
CPC ...... H01R 35/00; H01R 35/02; H01R 35/025; H01R 2201/26
USPC ..................................................... 439/15, 146
See application file for complete search history.

(56) References Cited

U.S. PATENT DOCUMENTS 7,147,496 B2 * 12/2006 Kuerschner ................... 439/164
2006/0141834 A1   6/2006 Kuerschner

FOREIGN PATENT DOCUMENTS

| DE | 8508742 U1 | 6/1985 |
| DE | 19858874 A1 | 7/1999 |
| FR | 2756108 A1 | 5/1998 |
| FR | 2830989 A1 | 4/2003 |
| JP | 01-112682 A | 5/1989 |
| JP | 04-87191 U | 7/1992 |
| JP | 06-068367 | 9/1994 |
| JP | 07-282935 A | 10/1995 |
| JP | 10-275668 A | 10/1998 |

(Continued)

*Primary Examiner* — Khiem Nguyen
(74) *Attorney, Agent, or Firm* — Rabin & Berdo P.C.

(57) ABSTRACT

The present invention relates to a steering roll connector for a vehicle. The steering roll connector includes a roll stator, a roll rotor, a roller plate, and a locking unit. The roll stator is fixed to a vehicle. The roll rotor is coaxial to the stator, is rotatable relative to the stator, and includes a rotor connector provided with a steering wheel connector. The roller plate is rotatably disposed between the roll stator and the roll rotor. When a steering wheel shaft of the vehicle is not installed on the steering roll connector, the locking unit maintains the steering roll connector in a neutral position. When the steering wheel shaft is installed on the steering roll connector, the locking unit enables the roll rotor to rotate relative to the roll stator.

7 Claims, 7 Drawing Sheets

(56) References Cited

FOREIGN PATENT DOCUMENTS

| | | |
|---|---|---|
| JP | 10-275669 A | 10/1998 |
| JP | 2001-057277 A | 2/2001 |
| JP | 2005-302650 A | 10/2005 |
| JP | 2009-081029 A | 4/2009 |
| JP | 2009-238419 A | 10/2009 |
| KR | 2007-0001044 A | 1/2007 |
| WO | WO-03/034551 A1 | 4/2003 |

* cited by examiner

STEERING ROLL CONNECTOR FOR A VEHICLE

TECHNICAL FIELD

The present invention relates to an apparatus for fixing a neutral position of a connector for vehicles, and particularly to, a roll connector for vehicles, which has a structure capable of simplifying an assembling process and reducing the processing cost.

BACKGROUND ART

In general, a steering wheel assembly for vehicles includes a steering wheel, a steering column, a steering roll connector assembly, and a multi-functional switch assembly. The steering wheel is intended to allow a driver to set a steering direction. The rotation of the steering wheel by the driver is transferred to the wheels of a vehicle through the steering column to set the steering angle of the vehicle wheel. The multi-functional switch assembly includes a light and a fog lamp, a wiper, various audio devices, and a vehicle window switch, and the like. The multi-functional switch assembly serves to prevent the driver's driving attention from being dissipated even during manipulation of a wide variety of devices by increasing the manipulability of the various devices. The multi-functional switch assembly is implemented as a button switch mounted on a top of the steering wheel, or a lever switch mounted on a side of the steering wheel. In addition, the steering wheel includes an air bag mounted on the top thereof to ensure the safety of the driver.

A roll connector is necessarily included which is constructed to establish the electrical communication with a wide range of electrical and electronic equipment included in a steering wheel assembly and supply electric power. Japanese Patent Laid-Open Publication No. Hei 4-87191 discloses a roll connector according to the prior art, which includes an outer pipe having a central hole formed at the center thereof, and a flexible cable fixed at one side thereof to the outer pipe and fixed at the other side thereof to an inner pipe, the flexible cable being accommodated between the outer pipe and the inner pipe in such a manner as to be wound in a clockwise direction on the inner wall of the outer pipe to be inverted in a U-shape and wound in a counterclockwise direction around the outer wall of the inner pipe.

Such a roll connector necessarily requires that its neutral position should be secured in the assembly process of the steering wheel assembly. That is, the roll connector must be delivered to an automotive assembly line in a state in which the relative rotation between a stator and a rotor included in the roll connector is prevented so as to able to accurately detect the amount of rotation of the steering wheel. A roll connector mounted with a neutral pin to secure the neutral position of the roll connector is supplied and logistically transported to an automotive assembly company. This roll connector according to the prior art is joined to a steering wheel shaft and is connected to a switch connector for transferring electric signals of switches of the steering wheel in an automotive assembly process. The conventional neutral pin causes an interference with an assembly position of the switch connector, which makes it impossible to pre-fabricate the switch connector.

The separate delivery of such respective elements to the automobile assembler involves a considerable problem in that logistics costs are increased, and there is a high possibility of erroneous assembly due to the presence of a complicated wire harness during the assembly of a car. In addition, the convention roll connector entails a problem in that it includes only a neutral pin with a detachable structure, so that when the car is re-assembled due to a problem of erroneous assembly occurring after removal of the neutral pin, the neutral position of the roll connector is released, thereby greatly deteriorating workability.

DISCLOSURE OF INVENTION

Technical Problem

Accordingly, it is an object of the present invention to provide a roll connector for vehicles, which can achieve the release of a neutral position of the roll connector by an automatic release of its locking state when a steering wheel shaft is mounted to the roll connector.

Technical Solution

To achieve the above objects, the present invention provides a steering roll connector for a vehicle comprising: a roll stator fixed to the vehicle; a roll rotor arranged coaxially and rotatably with respect to the roll stator, the roll rotor including a rotor connector provided with a steering wheel connector; a roller plate rotatably disposed between the roll stator and the roll rotor; and a locking unit configured to maintain the steering roll connector in a neutral position when a steering wheel shaft of the vehicle is not mounted on the steering roll connector, and enable the roll rotor to be rotated relative to the roll stator when the steering wheel shaft of the vehicle is mounted on the steering roll connector.

In the steering roll connector for a vehicle according to the present invention, the locking unit may include: a locking part disposed at a rotor locking mounting part disposed at a roll rotor side; and a locking mounting part disposed at a roll stator side to cause a change in an engagement state by the driving of the locking part.

In the steering roll connector for a vehicle according to the present invention, the locking mounting part may include: a stator locking mounting part disposed at the roll stator to correspond to the position of the locking part; and a roller plate locking mounting part disposed at the roller plate to correspond to the position of the locking part.

In the steering roll connector for a vehicle according to the present invention, the locking part may include: a locking block movably disposed at the rotor locking mounting part; a locking elastic part configured to abut at one end thereof against the rotor locking mounting part and abut at the other end thereof against the locking block to elastically support the locking block; and a locking hinge part brought into close contact at one end thereof with the lock block and brought into close contact at the other end thereof with a steering wheel shaft side of the vehicle in such a manner as to be disposed at the other end thereof pivotally at the roll rotor.

In the steering roll connector for a vehicle according to the present invention, the locking block may include: a locking block body movably disposed at the rotor locking mounting part; an elastic part-mounting part disposed at one end of the locking block body to support the locking elastic part; a hinge contact part formed at the locking block body to come into close contact with the locking hinge part; and a movable part formed at the other end of the locking block body so as to be engaged with the locking mounting part.

In the steering roll connector for a vehicle according to the present invention, the locking hinge part may include: a locking hinge body disposed at the rotor locking mounting part so as to be pivotally rotated about a locking hinge center part; a locking block contact part formed at one end of the locking hinge body so as to come into close contact with the locking block; and a movable part formed at the other end of the locking hinge body so as to so as to come into close contact with the steering wheel shaft of the vehicle.

In the steering roll connector for a vehicle according to the present invention, the roll rotor may include a locking stopper through-opening for allowing the locking hinge body to pass therethrough, and the locking hinge center part is mounted pivotally in the locking stopper through-opening.

In the steering roll connector for a vehicle according to the present invention, the roll rotor may further include a locking stopper formed on the outer surface of the locking stopper through-opening so as to prevent the locking hinge part from escaping from the locking stopper through-opening.

In the steering roll connector for a vehicle according to the present invention, the locking block contact part may be formed in a "⌐"-shape.

In the steering roll connector for a vehicle according to the present invention, the locking block may include: a locking block body movably disposed at the rotor locking mounting part; an elastic part-mounting part disposed at one end of the locking block body to support the locking elastic part; a hinge contact part formed at the locking block body to come into close contact with the locking hinge part; and a movable part formed at the other end of the locking block body so as to be engaged with the locking mounting part, and wherein the locking block contact part can be accommodated in the hinge contact part.

Advantageous Effects

The steering roll connector for a vehicle according to the present invention as constructed above have the following advantages.

First, the inventive steering roll connector for a vehicle can be maintained in a neutral state through an automatic locking structure, and its neutral state can be released by an automatic release of the locking state of the roll connector upon the mounting of the steering wheel shaft to the steering roll connector.

Second, the inventive steering roll connector for a vehicle enables a user to easily check whether the steering roll connector is in a neutral state with a naked eye through an automatic locking structure so that a possibility of deterioration in quality of the product due to an erroneous assembly can be remarkably decreased.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

MODE FOR CARRYING OUT THE INVENTION

Now, preferred embodiments of a steering roll connector for a vehicle including a locking unit according to the present invention will be described hereinafter in detail with reference to the accompanying drawings.

Figure 1:
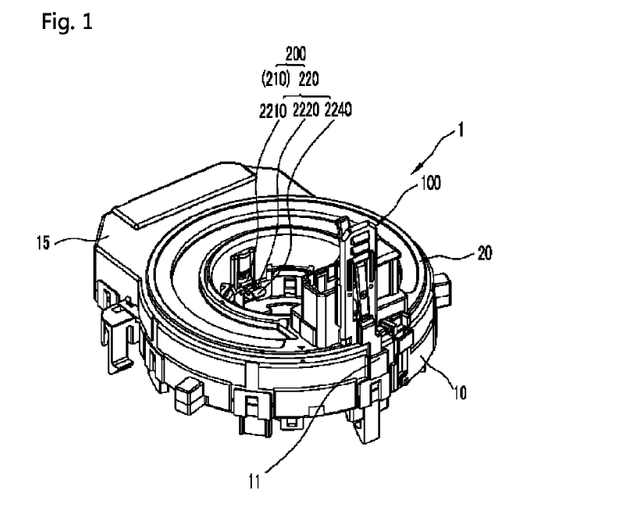
FIG. 1 is a schematic assembled perspective view illustrating a roll connector for vehicles, which is mounted with a locking unit according to an embodiment of the present invention.
Figure 2:
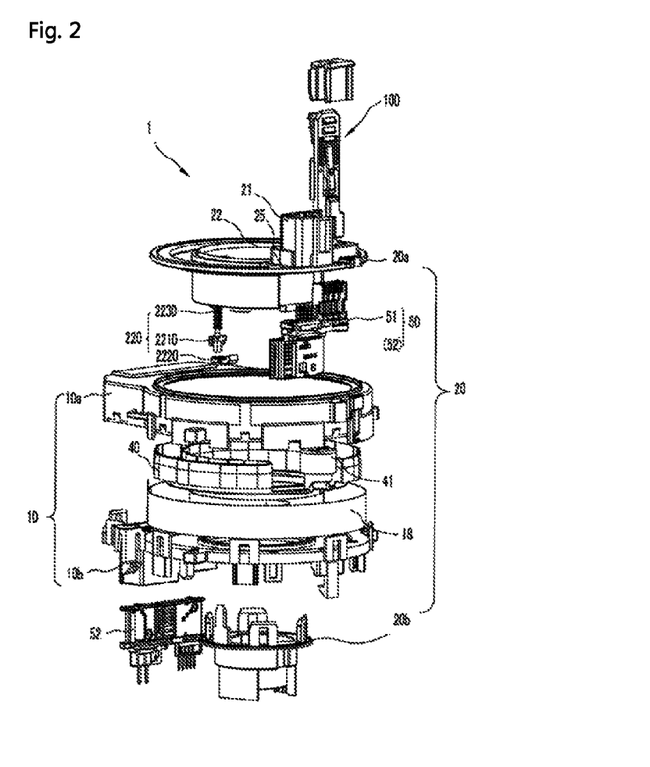
FIG. 2 is a schematic exploded perspective view illustrating the roll connector for vehicles of FIG. 1.
Figure 3:
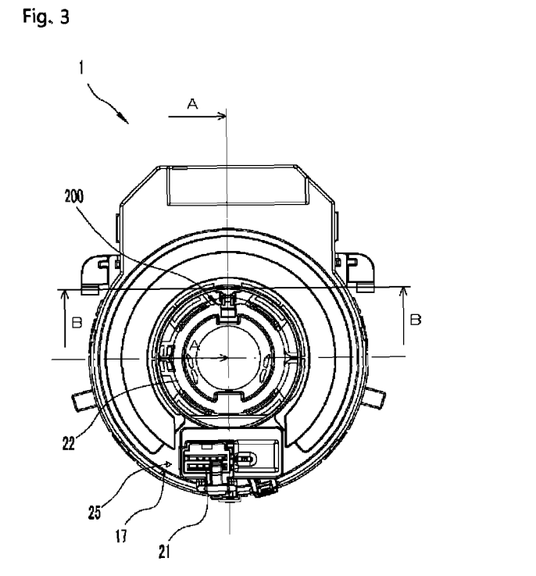
FIG. 3 is a schematic top plan view illustrating the roll connector for vehicles of FIG. 1.
Figure 4:
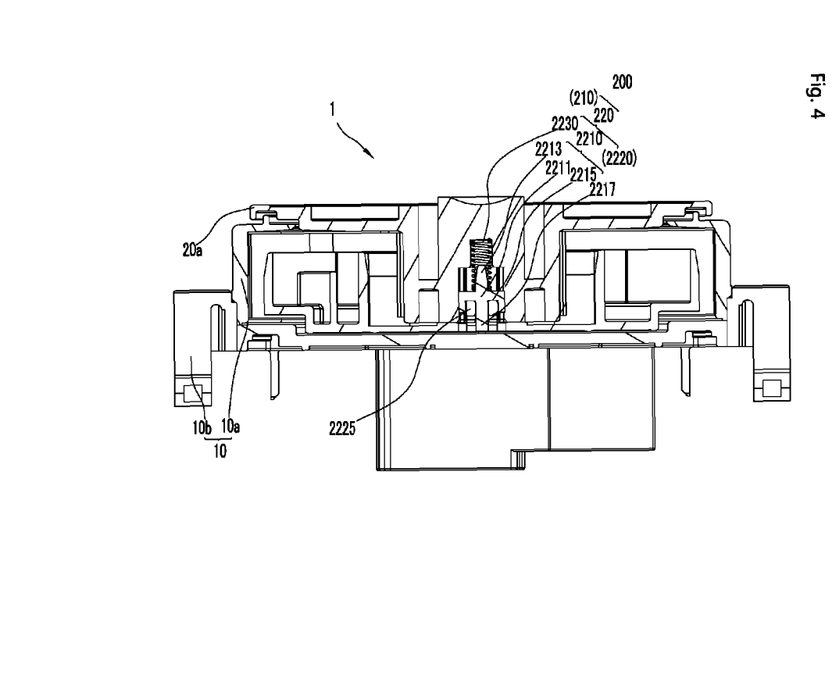
FIG. 4 is a cross-sectional view taken along the line B-B of FIG. 3.
Figure 5:
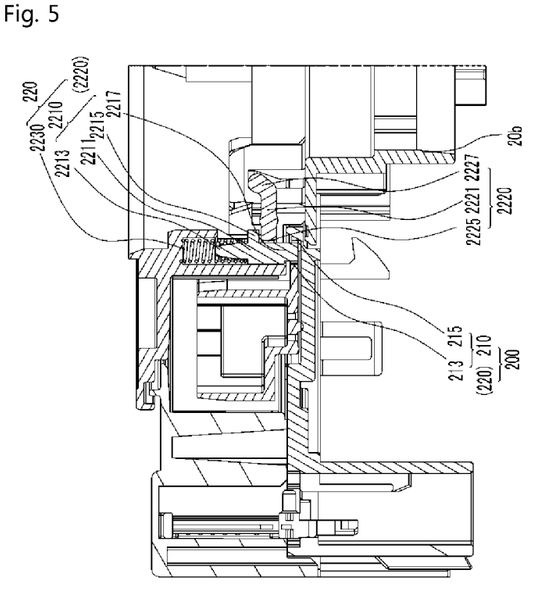
FIGS. 5, 6 and 7 are schematic cross-sectional views taken along the line A-A of FIG. 3, in which the roll connector is in a neutral position, in a locking released state, and in a state before/after rotation, respectively.
Figure 6:
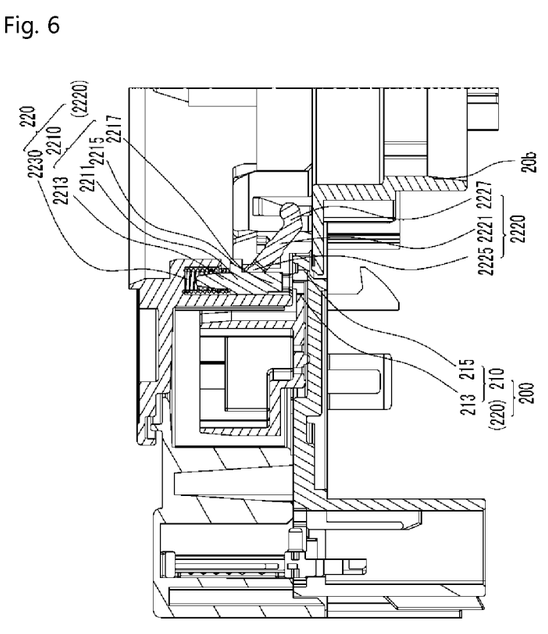
Figure 7:
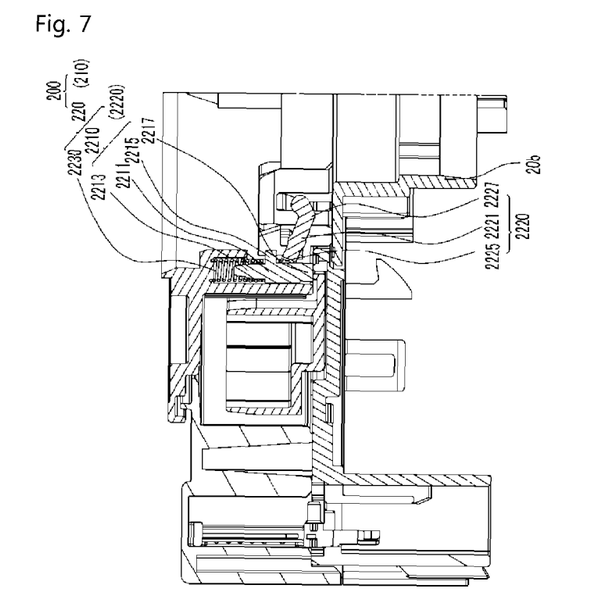
Figure 8:
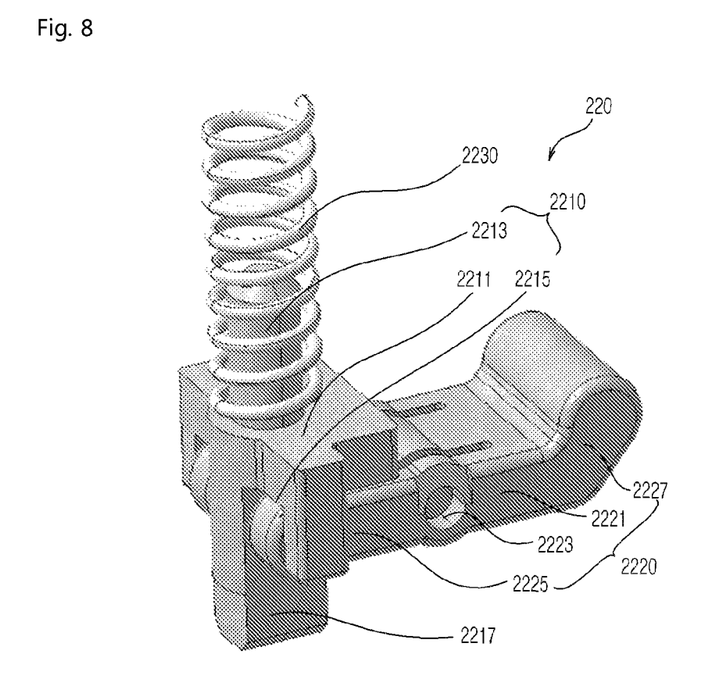
FIG. 8 is a schematic partial perspective view illustrating a locking unit.
Figure 9:
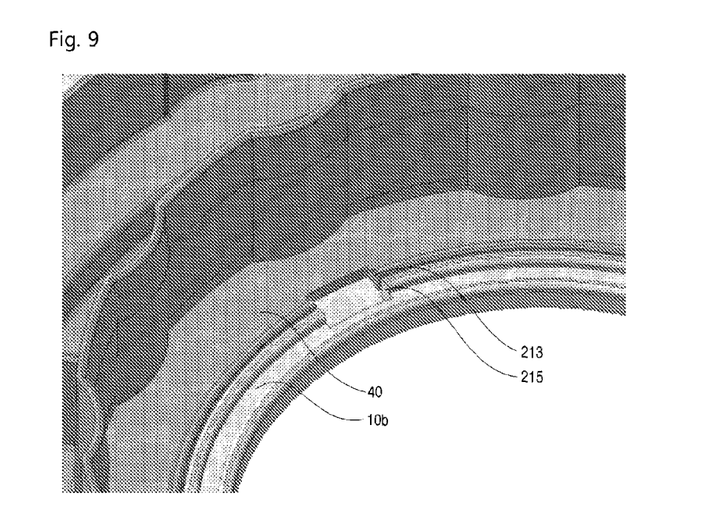
FIGS. 9 and 10 are a schematic partial perspective view illustrating before and after a locking mounting part of a locking unit is in a neutral state.
Figure 10:
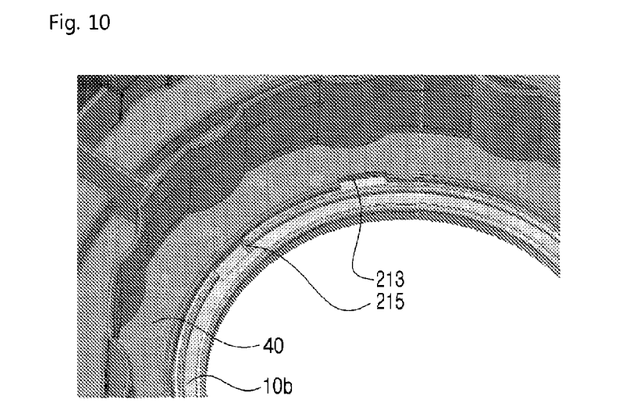
Figure 11:
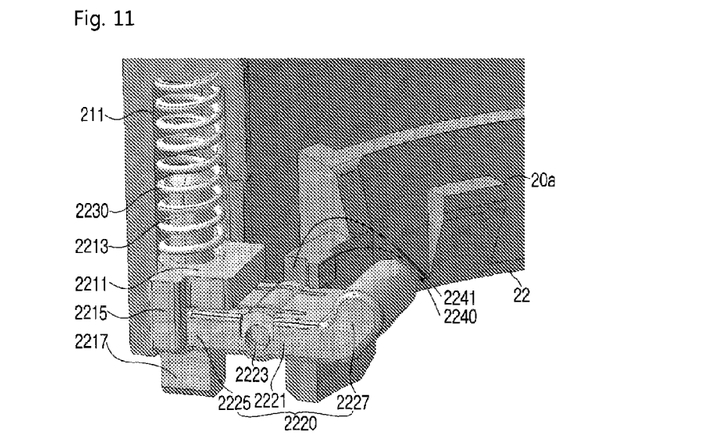
FIG. 11 is a schematic partial exploded perspective view illustrating a locking stopper of a locking unit.
Figure 12:
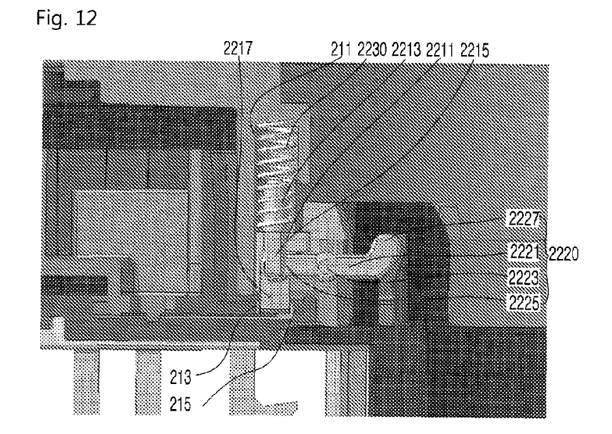
FIGS. 12 and 13 are partial exploded cross-sectional and perspective views illustrating a state in which a locking unit is in a neutral position.
Figure 13:
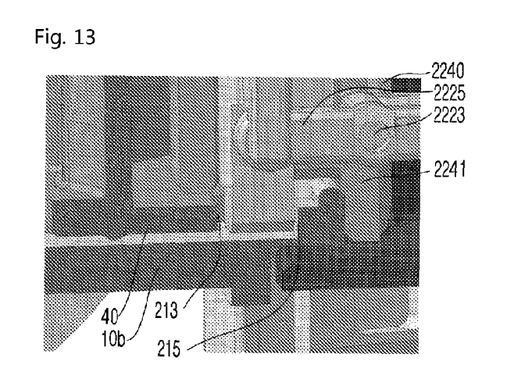
Figure 14:
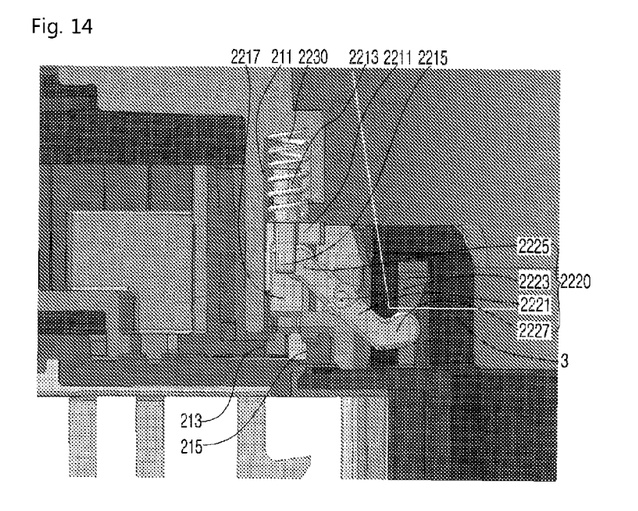
FIGS. 14 and 15 are partial exploded cross-sectional and perspective views illustrating a state in which the neutral position of a locking unit is released.
Figure 15:
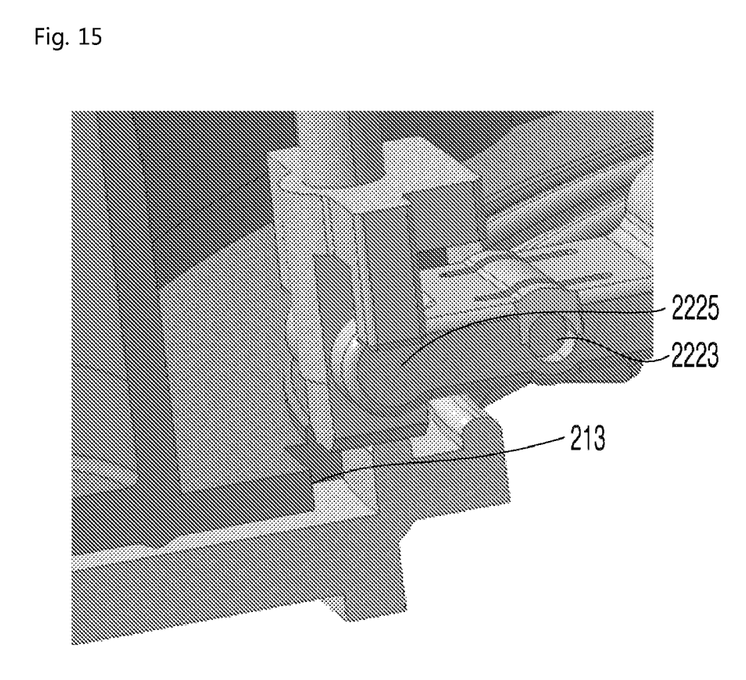

FIG. 1 is a schematic assembled perspective view illustrating a roll connector for vehicles, which is mounted with a locking unit according to an embodiment of the present invention, FIG. 2 is a schematic exploded perspective view illustrating the roll connector for vehicles of FIG. 1, FIG. 3 is a schematic top plan view illustrating the roll connector for vehicles of FIG. 1, FIG. 4 is a cross-sectional view taken along the line B-B of FIG. 3, FIGS. 5, 6 and 7 are schematic cross-sectional views taken along the line A-A of FIG. 3, in which the roll connector is in a neutral position, in a locking released state, and in a state before/after rotation, respectively, FIG. 8 is a schematic partial perspective view illustrating a locking unit, FIGS. 9 and 10 are a schematic partial perspective view illustrating before and after a locking mounting part of a locking unit is in a neutral state, FIG. 11 is a schematic partial exploded perspective view illustrating a locking stopper of a locking unit, FIGS. 12 and 13 are partial exploded cross-sectional and perspective views illustrating a state in which a locking unit is in a neutral position, and FIGS. 14 and 15 are partial exploded cross-sectional and perspective views illustrating a state in which the neutral position of a locking unit is released.

A steering roll connector 1 for a vehicle including a locking unit 200 according to an embodiment of the present invention enables the locking unit 200 to automatically release the locked state in which the steering roll connector is in a neutral position depending on whether or not a steering wheel shaft (not shown) of the vehicle is mounted on the steering roll connector.

As shown in FIGS. 1 and 2, the steering roll connector 1 for a vehicle includes a roll stator 10 and a roll rotor 20. The roll stator 10 includes a roll stator cover 10a and a roll stator base 10b, which are joined to each other in such a manner as to be fixedly mounted to the vehicle. The roll rotor 20 includes a roll rotor plate 20a and a roll rotor rotation center part 20b, which are joined to each other in such a manner as to be rotatably mounted relative to the roll stator 10. Each of the roll stator 10 and the roll rotor 20 has a through-opening formed at the center thereof. The roll rotor 20 is mounted around a steering wheel shaft (not shown) of the vehicle through the through-opening so that the roll rotor is rotated together with the steering wheel shaft (not shown) being rotated in response to the steering of a driver. The locking unit 200, which will be described later, is disposed so as to exposed to the inside of a through-opening 22 formed in the roll rotor plate 20*a* of the roll rotor 20. The roll rotor 20 includes a neutral position-checking rotor mark 25, and the roll stator 10 includes a neutral position-checking stator mark 17, so that the positional alignment therebetween is performed and the formation of a state in which the steering roll connector is in a neutral position can be checked through an accurate setting of the number of revolutions of the roll rotor plate or the roll rotor The roll stator 10 includes a vehicle roll connector terminal part 15 formed at a bottom thereof so that a flat cable connector 52 is disposed at the vehicle roll connector terminal part 15. The flat cable connector 52 includes a roll connector terminal 16 at an end thereof so as to establish the physical connection with an external electric device such as a control unit (not shown) of the vehicle and thus the electrical communication between the flat cable connector and the external electric device. The roll rotor 20 is mounted rotatably relative to the roll stator 10 (10*a*; 10*b*), and is rotated together with the steering wheel shaft (not shown) of the vehicle. The roll rotor 20 includes a rotor connector 21 mounted on a top thereof so that the flat cable connector 51 is disposed on the rotor connector 21. The rotor connector 21 is coupled to a wheel switch (not shown) disposed on the steering wheel of the vehicle and/or a steering wheel connector 30 for transferring an electric signal from a lever switch (not shown), or the like. The steering wheel connector 30 establishes the electrical communication with a wiring 31 such that it establishes the electrical communication with the wheel switch (not shown) disposed on the steering wheel (not shown) and/or the lever switch (not shown).

A flexible printed circuit board (FPCB) or a circuit wiring 18 is disposed in an internal space defined by the roll rotor 20 and the roll stator 10. The flexible printed circuit board or the circuit wiring establish the electrical communication with the rotor connector 21 and the roll connector terminal 16 of the roll connector terminal part 15, so that they transfer a change in an electric signal from the wheel switch and/or the lever switch for an operating mode by a user to a control unit, which in turn applies a control signal to each actuator correspondingly. Thus, a predetermined operating mode desired by the user can be performed. The stable winding and release of the flexible printed circuit board or the circuit wiring is performed through a roller plate 40 and a roller 41 upon the relative rotation between the roll rotor and the roll stator.

The roll stator 10 has a stator neutral mounting part 11 formed thereon and the roll rotor 20 has a rotor neutral mounting part 23 formed thereon. More specifically, the stator neutral mounting part 11 is formed on a side of the roll stator 10 and has a stator neutral mounting groove 12, and the rotor neutral mounting part 23 is formed to have a stator neutral mounting groove.

A neutral pin unit 100 for the vehicle roll connector is mounted at the steering roll connector 1 for a vehicle to prevent occurrence of a variation in the neutral position of the steering roll connector 1. The neutral pin unit 100 for the vehicle roll connector, that is, a detachable neutral pin in this embodiment is disposed at the side of the roll rotor and the roll stator so that an assembling worker removes the detachable neutral pin from the steering roll connector for a vehicle to enable the roll rotor to be rotated relative to the roll stator.

Meanwhile, the locking unit 200 of the steering roll connector 1 for a vehicle according to an embodiment of the present invention maintains the steering roll connector 1 in a neutral position when the steering wheel shaft (not shown) of the vehicle is not mounted on the steering roll connector 1, and enables the roll rotor 20 to be rotated relative to the roll stator 10 by releasing the neutral state of the steering roll connector 1 when the steering wheel shaft (not shown) of the vehicle is mounted on the steering roll connector.

More specifically, the locking unit 200 disposed on the steering roll connector 1 for a vehicle according to the present invention includes a locking mounting part 210 and a locking part 220. In FIGS. 4 and 7, there is shown a cross-sectional view of the locking unit 200. The locking part 220 is disposed at a rotor locking mounting part 211 disposed at a roll rotor 20 side, and the locking mounting part 210 is disposed at a roll stator 10 side to cause a change in an engagement state by the driving of the locking part 220. The rotor locking mounting part 211 (see FIG. 5) is formed on an inner side of the through-hole 22 formed at the center of the roll rotor plate 20*a* of the roll rotor 20 so that the locking part 220 is movably disposed at the rotor locking mounting part 211.

The locking mounting part 210 is connected to the locking part 220 disposed at the rotor locking mounting part 211. As shown in FIGS. 9 and 10, the locking mounting part 210 includes a stator locking mounting part 215 and a roller plate locking mounting part 213. The stator locking mounting part 215 is disposed at the roll stator 20 to correspond to the position of the locking part 220, and the roller plate locking mounting part 213 is disposed at the roller plate 40 to correspond to the position of the locking part 220. The locking part 220 is disposed at the rotor locking mounting part 211 formed at the roll rotor 20, so that when the roll rotor 20 is rotated after the mounting of the steering wheel shaft of the vehicle on the steering roll connector, the locking part 220 is rotated together with the roll rotor 20 to enable the locking part 220 to be rotated relative to the stator locking mounting part 215 or the roller plate locking mounting part 213. Accordingly, by virtue of an engagement structure between the locking part 220 and the locking mounting part 210, the steering roll connector 1 for a vehicle has a structure in which it can be maintained in a neutral position when a steering wheel shaft of the vehicle is not mounted on the steering roll connector, and the neutral state of the steering roll connector 1 can be released when the steering wheel shaft is mounted on the steering roll connector.

The stator locking mounting part 215 is formed at the roll stator base 10*b* of the roll stator 10, and has a structure in which its center is positioned at the steering wheel shaft or the roll rotor rotation center part 20*b* of the roll rotor 20. The roller plate is disposed on a top of the roll stator base 10*b*. The diameter of a through-opening formed in the roller plate 40 is larger than that of a through-opening formed in the roll stator base 10*b*, so that a region exists where a part of the roll stator base 10*b* is oriented toward the rotor locking mounting part 211 of the roll rotor 20. The stator locking mounting part 215 is positioned at this region. In addition, the roller plate locking mounting part 213 is formed at the roller plate 40 so as to be positioned at the outside of the stator locking mounting part 215. In the case where the roller plate 40 is rotated to secure a predetermined position where the neutral state of the roll connector 1 for the vehicle is maintained, the roller plate locking mounting part 213 and the stator locking mounting part 215 form a predetermined space together to enable the locking part 220 to be inserted and accommodated therein. On the other hand, in the case where a relative rotation occurs between the roller plate 40 and the roll stator base 10*b* to cause the neutral state of the steering roll connector for vehicle to be released, the roller plate locking mounting part 213 and the stator locking mounting part 215 forms an angle spaced state as shown in FIG. 10 to cause the insertion and accommodation of the locking part 220 to be restricted by the roller plate locking mounting part 213 and the stator locking mounting part 215.

The locking part 220 includes a locking block 2210, a locking elastic part 2230, and a locking hinge part 2220. The locking block 2210 is movably disposed at the rotor locking mounting part 221. The locking elastic part 2230 abuts at one end thereof against the rotor locking mounting part 221 and abuts at the other end thereof against the locking block 2210 to elastically support the locking block 2210. The locking hinge part 2220 is brought into close contact at one end thereof with the lock block 2210 and can be brought into close contact at the other end thereof with a steering wheel shaft side of the vehicle in such a manner as to be disposed at the other end thereof pivotally, more specifically disposed to be operated in a see-saw motion manner at the roll rotor 20, i.e., the roll rotor plate 20a.

The locking block 2210 includes a locking block body 2211, an elastic part-mounting part 2213, a hinge contact part 2215, and a movable part 2217. The locking block body 2211 is formed as a block body which is movably disposed at the rotor locking mounting part 221 formed on the roll rotor plate 20a. The elastic part-mounting part 2213 is disposed on a top of the locking block body 2211. The locking elastic part 2230 according to this embodiment is implemented as a coil spring type elastic body. The coil spring type locking elastic part 2230 is disposed at one end thereof at the elastic part-mounting part 2213 and abuts at the other end thereof against the inner surface of the rotor locking mounting part 221 to elastically support the locking block body 2211. The elastic part-mounting part 2213 is formed as a salient structure so as to be inserted into one end of the coil spring type locking elastic part 2230 so that when the locking block body 2211 is moved at the rotor locking mounting part 221, the locking elastic part 2230 can be stably pressed or can be returned to its original position.

The hinge contact part 2215 is formed at the locking block body 2211 to come into close contact with the locking hinge part 2220 which will be described later.

The locking block body 2211 can be moved by a force transferred thereto through the locking hinge part 2220.

The hinge contact part 2215 (see FIG. 8) is formed in a "⊒"-shape, and a locking block contact part 2225 (see FIG. 8) of the locking hinge part 2220, which will be described later, is formed in a "⊏"-shape, so that the locking block contact part 2225 of the locking hinge part 2220 can be accommodated in the hinge contact part 2215. By virtue of such a structure, an external force can be transferred stably through the locking hinge part 2220.

The movable part 2217 is disposed at the other end of the locking block body 2211 so as to be engaged with the locking mounting part 210. The movable part 2217 has a salient structure formed protrudingly downwardly from the other end of the locking block body 2211. When the locking block body 2211 is moved, the movable part 2217 is also moved to cause the engagement between the locking unit 220 and the locking mounting part 210 to be maintained or released so that the steering roll connector for a vehicle can be maintained in a neutral state or its neutral state can be released.

The locking hinge part 2220 includes a locking hinge body 2221, a locking block contact part 2225, and a movable part 2227. The locking hinge body 2221 is disposed at the rotor locking mounting part 211 so as to be pivotally rotated about a locking hinge center part 2223, and the locking block contact part 2225 is formed at one end of the locking hinge body so as to come into close contact with the hinge contact part 2215. The movable part 2227 is formed at the other end of the locking hinge body so as to come into close contact with the steering wheel shaft of the vehicle.

The locking hinge body 2221 is constructed as a predetermined rectangular parallelepiped block. The locking hinge body 2221 has a locking hinge center part 2223 formed at the center thereof. The locking hinge center part 2223 is disposed pivotally at a roll rotor plate 20a side of the roll rotor 20, more specifically at the outer side of the rotor locking mounting part 211, so that the locking hinge body 2221 can perform a pivotal/see-saw motion with respect to the roll rotor plate 20a. The locking hinge center part 2223 may have a structure in which a separate center shaft is penetratingly disposed therein, but may have a structure in which it is formed in a given grooved shape and a mating part (not shown) is formed at the outer side of the rotor locking mounting part 211 of the roll rotor plate 20a to correspond to the grooved locking hinge center part 2223 to perform the relative rotation between the grooved locking hinge center part and the mating part to enable a predetermined see-saw motion.

The locking block contact part 2225 is positioned at one end of the locking hinge body 2221. The structure of the locking block contact part 2225 and the contact structure between the locking block contact part 2225 and the hinge contact part 2215 are the same as described above. As shown in FIG. 8, although it has been described in this embodiment that the "⊏"-shaped locking block contact part 2225 is simply inserted into and accommodated in the "⊒"-shaped hinge contact part 2215, the locking block contact part 2225 and the hinge contact part 2215 may be constructed in various manners, such as having a structure in which predetermined projections are formed on the outer surface of the locking block contact part and predetermined recesses are formed on the inner surface of the hinge contact part to correspond to the positions of the projections to cause the locking block contact part and the hinge contact part to be pivotally engaged with each other through the engagement between the projections and the recesses so that the locking block 2210 can be moved stably through the locking hinge part 2220.

The movable part 2227 of the locking hinge part 2220 is formed at the other end of the locking hinge body 2221. The movable part 2227 is exposed toward the central through-opening of the roll rotor plate 20a, which allows the steering wheel shaft for the vehicle to pass through the rotor locking mounting part 211 so that when the steering wheel shaft is mounted on the steering roll connector for the vehicle, the movable part causes the locking hinge body 2221 to perform a see-saw motion by receiving a force from the steering wheel shaft.

Meanwhile, a locking stopper through-opening 2241 is formed at the roll rotor 20, more specifically at the central inner portion of the roll rotor plate 20a. The movable part 2227 connected with the movable part 2227 is protrudingly disposed toward the central inner portion of the roll rotor plate in which the steering wheel shaft is mounted through the locking stopper through-opening 2241.

One end of the locking hinge part 2220 may be oriented toward the locking part 220 disposed at the rotor locking mounting part 211 through the locking stopper through-opening 2241, and the other end of the locking hinge part 2220 may be disposed so as to be exposed to the through-opening formed at the central inner portion of the roll rotor plate.

The grooved locking hinge center part 2223 of the locking hinge par 2220 have a structure in which it is pivotally rotated in a see-saw motion manner through the engagement with a mating part formed protrudingly from the inner surface of the locking stopper through-opening 2241.

A locking stopper 2240 is formed at an end side of the outer surface of the locking stopper through-opening 2241 so as to be oriented toward the movable part 2227. That is, as shown in FIG. 11, the locking stopper 2240 is formed protrudingly from the outer end of the locking stopper through-opening 2241 toward the central portion of the roll rotor plate in which the steering wheel shaft is mounted. At this time, the locking stopper 2240 comes into close contact with one surface of the locking hinge body 2221. When the locking part 220 is engaged with the locking mounting part 210 to cause the steering roll connector 1 for a vehicle to be maintained in a neutral state, the locking stopper 2240 is brought into close contact with the locking hinge body 2221 so that the locking hinge body 2221 can be prevented from excessively performing a see-saw motion by an elastic support force generated by the locking elastic part 2230.

Hereinafter, the operation of the locking unit 200 of the roll connector 1 for the vehicle will be described with reference to FIGS. 12 to 15.

In the case where the roll connector 1 for the vehicle is maintained in an initial state, i.e., in a neutral state, the locking part 220 maintains the engagement state with the locking mounting part 210. In other words, as shown in FIGS. 12 and 13, the locking block 2210 establishes the engagement with the mounting part 210, i.e., the roller plate locking mounting part 213 formed at the roller plate 40 and the stator locking mounting part 215 formed at the roll stator 10 by the elastic support force of the locking elastic part 2230 so as to maintain the roll connector 1 for the vehicle in a neutral state. In this case, the locking hinge part 2220 coming into close contact with the locking block 2210 is supported by the locking stopper 2240 so as to prevent an excessive pivotal rotation of the locking hinge body 2221 of the locking hinge part 2220 by the elastic force of the locking elastic part 230 so that the engagement of the movable part 2217 with the roller plate locking mounting part 213 and the stator locking mounting part 215 is maintained.

Thereafter, when the steering wheel shaft 3 is inserted into the through-opening 22 through the engagement between the roll connector 1 for the vehicle and the steering wheel shaft 3 (see FIG. 14) indicated by an imaginary line, it presses the locking hinge part 2220 of the locking part 2220. In this case, when the movable part 2227 of the locking hinge part 2220 is pressed by the steering wheel shaft 3, the locking block contact part 2225 transfers an external force to the locking block body 2211 to press the locking elastic part 230 to cause the locking block body 2211 to be moved upwardly on the drawing sheet together with the movable part 2217 formed at the other end of the locking block body 2211 to be moved, so that the engagement between the movable part 2217 and the locking mounting part 210 can be released to enable the rotational movement of the roller plate 40 and the roll rotor 20 to release the neutral state of the steering roll connector for the vehicle.

Even in the case where the neutral state of the steering roll connector is released, when the roller plate locking mounting part 213 and the stator locking mounting part 215 are aligned through a given rotational movement of the roll rotor 20 and the roller plate 40 after the steering wheel shaft is demounted from the steering roll connector for a vehicle, the locking block 2210 is displaced to the locking mounting part 210 by the elastic support force of the locking elastic part 2230 to re-establish the engagement structure, so that formation of the neutral state of the steering roll connector can be checked with a naked eye and a stable disassembly and re-assembly process can be performed.

INDUSTRIAL APPLICABILITY

The steering roll connector of the present invention mounted on a vehicle can be variously applied to an apparatus that requires the transfer of an electric signal while performing a given rotational movement, and simultaneously requires the setting of a standard for a neutral position during production and maintenance and repair thereof.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

The invention claimed is:
1. A steering roll connector for a vehicle comprising:
a roll stator fixed to the vehicle;
a roll rotor arranged coaxially and rotatably with respect to the roll stator, the roll rotor including a rotor connector provided with a steering wheel connector;
a roller plate rotatably disposed between the roll stator and the roll rotor; and
a locking unit configured to maintain the steering roll connector in a neutral position when a steering wheel shaft of the vehicle is not mounted on the steering roll connector, and enable the roll rotor to be rotated relative to the roll stator when the steering wheel shaft of the vehicle is mounted on the steering roll connector,
wherein the locking unit comprises:
a locking part disposed at a rotor locking mounting part disposed at a roll rotor side;
a stator locking mounting part formed at the roll stator to correspond to the position of the locking part; and
a roller plate locking mounting part formed at the roller plate,
wherein the locking part comprises:
a locking block movably disposed at the rotor locking mounting part;
a locking elastic part configured to abut at one end thereof against the rotor locking mounting part and abut at the other end thereof against the locking block to elastically support the locking block; and
a locking hinge part brought into close contact at one end thereof with the lock block and brought into close contact at the other end thereof with a steering wheel shaft side of the vehicle in such a manner as to be disposed at the other end thereof pivotally at the roll rotor,
wherein,
when a steering wheel shaft of the vehicle is not mounted on the steering roll connector, the roller plate locking mounting part and the stator locking mounting part are disposed to correspond to each other and forms a predetermined space together to enable the locking block to be inserted and accommodated therein when a steering wheel shaft of the vehicle is not mounted on the steering roll connector, and when the steering wheel shaft of the vehicle is mounted on the steering roll connector, the locking hinge part pivots to move the locking block out of the predetermined space.

2. The steering roll connector for a vehicle according to claim 1, wherein the locking block comprises:
   a locking block body movably disposed at the rotor locking mounting part;
   an elastic part-mounting part disposed at one end of the locking block body to support the locking elastic part;
   a hinge contact part formed at the locking block body to come into close contact with the locking hinge part; and
   a movable part formed at the other end of the locking block body to be inserted into and be moved out of the predetermined space.

3. The steering roll connector for a vehicle according to claim 1, wherein the locking hinge part comprises:
   a locking hinge body disposed at the rotor locking mounting part so as to be pivotally rotated about a locking hinge center part;
   a locking block contact part formed at one end of the locking hinge body so as to come into close contact with the locking block; and
   a movable part formed at the other end of the locking hinge body so as to so as to come into close contact with the steering wheel shaft of the vehicle.

4. The steering roll connector for a vehicle according to claim 3, wherein the roll rotor comprises a locking stopper through-opening for allowing the locking hinge body to pass therethrough, and
   the locking hinge center part is mounted pivotally in the locking stopper through-opening.

5. The steering roll connector for a vehicle according to claim 4, wherein the roll rotor further comprises a locking stopper formed on the outer surface of the locking stopper through-opening so as to prevent the locking hinge part from escaping from the locking stopper through-opening.

6. The steering roll connector for a vehicle according to claim 3, wherein the locking block contact part is formed in a "⌐"-shape.

7. The steering roll connector for a vehicle according to claim 6, wherein the locking block comprises:
   a locking block body movably disposed at the rotor locking mounting part;
   an elastic part-mounting part disposed at one end of the locking block body to support the locking elastic part;
   a hinge contact part formed at the locking block body to come into close contact with the locking hinge part; and
   a movable part formed at the other end of the locking block body to be insertable into and be movable out of the predetermined space, and
   wherein the locking block contact part can be accommodated in the hinge contact part.

* * * * *